US012160858B2

United States Patent
Awoniyi-Oteri et al.

(10) Patent No.: US 12,160,858 B2
(45) Date of Patent: Dec. 3, 2024

(54) RANDOMIZATION OF XR TRAFFIC ARRIVAL TIME

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 691 days.

(21) Appl. No.: 17/464,391

(22) Filed: Sep. 1, 2021

(65) Prior Publication Data

US 2022/0086868 A1    Mar. 17, 2022

Related U.S. Application Data

(60) Provisional application No. 63/079,899, filed on Sep. 17, 2020.

(51) Int. Cl.
*H04W 72/12* (2023.01)
*H04W 72/1263* (2023.01)
*H04W 76/10* (2018.01)

(52) U.S. Cl.
CPC ....... *H04W 72/1263* (2013.01); *H04W 72/12* (2013.01); *H04W 76/10* (2018.02)

(58) Field of Classification Search
CPC ............. H04W 72/1263; H04W 76/10; H04W 28/0875; H04L 5/0051; H04L 5/0048
See application file for complete search history.

(56) References Cited

U.S. PATENT DOCUMENTS

| | | | |
|---|---|---|---|
| 2020/0236692 A1* | 7/2020 | Lin | H04L 5/0007 |
| 2020/0267084 A1* | 8/2020 | Hande | H04L 47/283 |
| 2022/0407647 A1* | 12/2022 | Baek | H04W 72/20 |

OTHER PUBLICATIONS

VIIVO: "Views on XR and Cloud Gaming evaluation", 3GPP Draft, 3GPP TSG RAN WGl#102-e, R1-2005412, vol. NWG1, No. e-Meeting, Aug. 8, 2020 (Aug. 8, 2020), pp. 21 p. 10. (Year: 2020).*

(Continued)

*Primary Examiner* — Romani Ohri
(74) *Attorney, Agent, or Firm* — Procopio, Cory, Hargreaves & Savitch LLP

(57) ABSTRACT

Methods, computer program products, and apparatuses for staggering downlink and uplink communications are provided. An example method at a UE includes establishing a connection with a base station. The example method further includes receiving, from the base station, at least one staggering indication comprising a downlink staggering offset for downlink communication and an uplink staggering offset for uplink communication, the downlink communication being an XR, a VR, or an AR downlink communication and the uplink communication being an XR, a VR, or an AR uplink communication. The example method further includes communicating, with the base station, via downlink communication or uplink communication based on the uplink staggering offset and the downlink staggering offset.

28 Claims, 11 Drawing Sheets

(56) References Cited

OTHER PUBLICATIONS

VIVO, views on XR and Cloud Gaming evaluation, 3GPP TSG RAN WG1# 102-e, e-meeting, Aug. 17-28, 2020. R1-2005412. pp. 1-21, 2020 (Year: 2020).*

International Search Report and Written Opinion—PCT/US2021/048936—ISA/EPO—Dec. 22, 2021.

VIVO: "Views on XR and Cloud Gaming evaluation", 3GPP Draft, 3GPP TSG RAN WGI #102-e, R1-2005412, vol. RAN WG1, No. e-Meeting, Aug. 8, 2020 (Aug. 8, 2020), XP051917437, 21 Pages, Retrieved from the Internet: URL : https://ftp.3gpp.org/tsg_ran/WG1_RL1/TSGR1_102-e/Docs/R1-2005412.zip. p. 1-p. 2, p. 4-p. 5, p. 8-p. 10.

* cited by examiner

RANDOMIZATION OF XR TRAFFIC ARRIVAL TIME

CROSS REFERENCE TO RELATED APPLICATION(S)

This application claims the benefit of and priority to U.S. Provisional Application Ser. No. 63/079,899, entitled "RANDOMIZATION OF XR TRAFFIC ARRIVAL TIME" and filed on Sep. 17, 2020, which is expressly incorporated by reference herein in its entirety.

TECHNICAL FIELD

The present disclosure relates generally to communication systems, and more particularly, to wireless communication systems with extended reality (XR), virtual reality (VR), or augmented reality (AR) downlink and uplink communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, computer programs products, and apparatuses for dynamic indication of measurement sources for CSI reporting are provided. In one aspect of the disclosure, a method, a computer-readable medium, and an apparatus are provided for wireless communication of a user equipment (UE). A UE may establish a connection with a base station. The UE may receive, from the base station, at least one staggering indication including a downlink staggering offset for downlink communication and an uplink staggering offset for uplink communication, the downlink communication being an XR, a VR, or an AR downlink communication and the uplink communication being an XR, a VR, or an AR uplink communication. The UE may communicate, with the base station, via downlink communication or uplink communication based on the uplink staggering offset and the downlink staggering offset.

In another aspect of the disclosure, a method, a computer-readable medium, and an apparatus are provided for wireless communication of a base station. A base station may establish a connection with a UE. The base station may transmit, to the UE, at least one staggering indication including a downlink staggering offset for downlink communication and an uplink staggering offset for uplink communication, the downlink communication being an XR, a VR, or an AR downlink communication and the uplink communication being an XR, a VR, or an AR uplink communication. The base station may communicate, with the UE, via downlink communication or uplink communication based on the uplink staggering offset and the downlink staggering offset.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
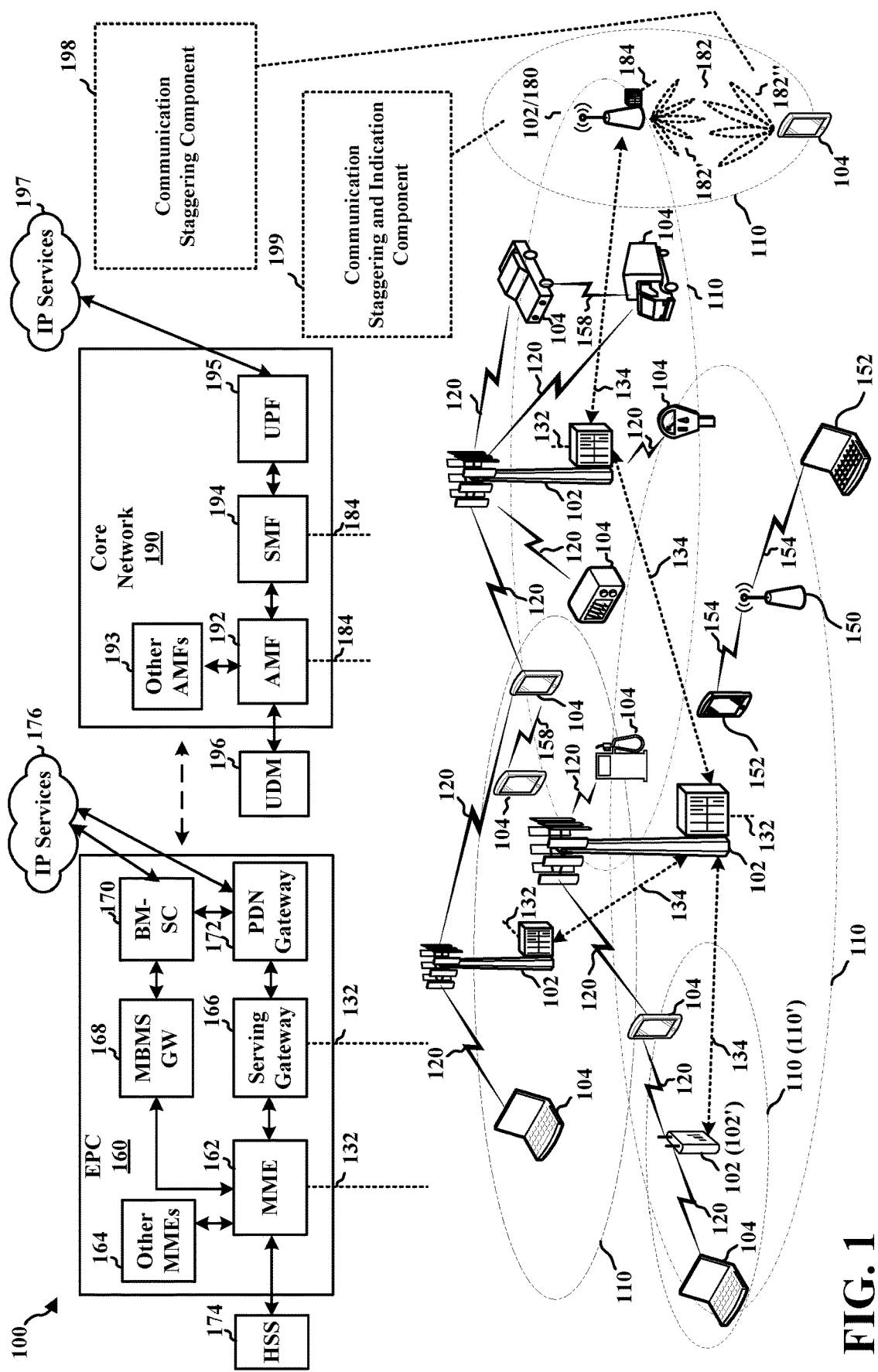
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (IMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include communication staggering component 198 configured to establish a connection with the base station 180. The communication staggering component 198 may also be configured to receive, from the base station 180, at least one staggering indication including a downlink staggering offset for downlink communication and an uplink staggering offset for uplink communication, the downlink communication being an XR, a VR, or an AR downlink communication and the uplink communication being an XR, a VR, or an AR uplink communication. The communication staggering component 198 may also be configured to communicate, with the base station 180, via downlink communication or uplink communication based on the uplink staggering offset and the downlink staggering offset. In certain aspects, the base station 180 may include communication staggering and indication component 199. The communication staggering and indication component 199 may be configured to establish a connection with the UE 104. The communication staggering and indication component 199 may be further configured to transmit, to the UE 104, at least one staggering indication including a downlink staggering offset for downlink communication and an uplink staggering offset for uplink communication, the downlink communication being an XR, a VR, or an AR downlink communication and the uplink communication being an XR, a VR, or an AR uplink communication. The communication staggering and indication component 199 may be further configured to communicate, with the UE 104, via downlink communication or uplink communication based on the uplink staggering offset and the downlink staggering offset.

Although the following description may be focused on 5G NR, the concepts described herein may be applicable to other similar areas, such as LTE, LTE-A, CDMA, GSM, and other wireless technologies.

Figure 2:
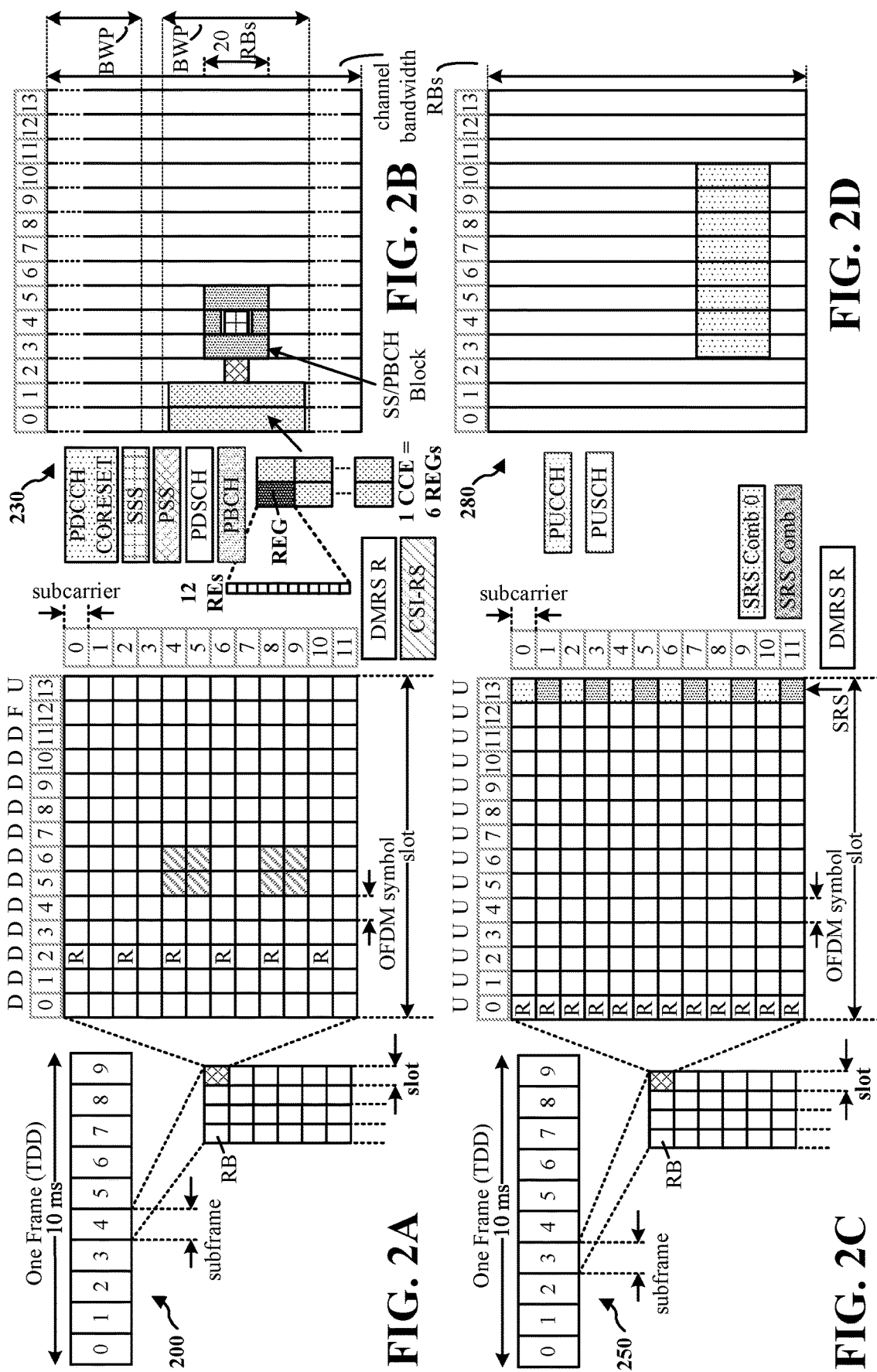
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
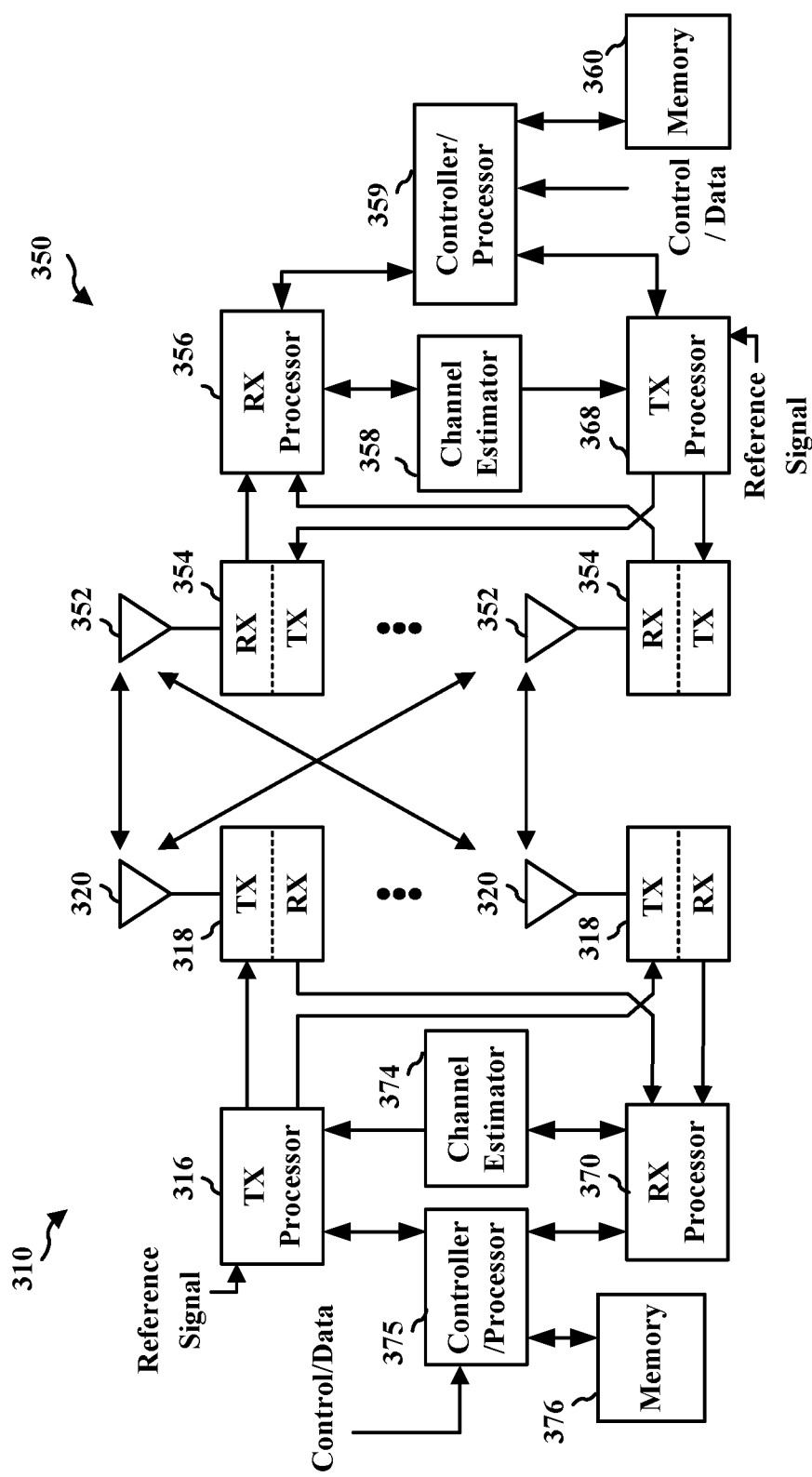
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with communication staggering component 198 of FIG. 1.

At least one of the TX processor 316, the RX processor 370, and the controller/processor 375 may be configured to perform aspects in connection with communication staggering and indication component 199 of FIG. 1.

In some wireless communication systems, XR, AR, and VR applications may be integrated and supported. XR may refer to all real-and-virtual combined environments and human-machine interactions generated by computer technology and wearables such as AR, mixed reality (MR), VR, or the like. XR data traffic may be periodic, and XR communications may be downlink communications or uplink communications. For downlink XR communications, the data rate may be moderate to high, and the downlink XR communications may be subject to latency specifications. For uplink XR communications, the data rate may not be as high as downlink XR communications, but the uplink XR communications may still be subject to latency specifications. Methods, apparatuses, and computer program products for possibly reducing latency are provided herein. As provided herein, randomizing uplink and downlink data traffic arrival time by introducing a staggering offset (with a duration) to uplink communication and downlink communication may help alleviate data queue build up. The randomization may also reduce interference because the communications are more spread out in time. Reducing interference may reduce the probability of erroneous communications. For example, for a base station serving ten UEs indoor, a staggering offset provided herein may increase the percentage of UEs with 99% files delivered before the packet delay budget (PDB) by 20%. For a base station serving fifteen UEs outdoor within 100 meters, a staggering offset provided herein may increase the percentage of UEs with 99% files delivered before the PDB by 10%.

Figure 4:
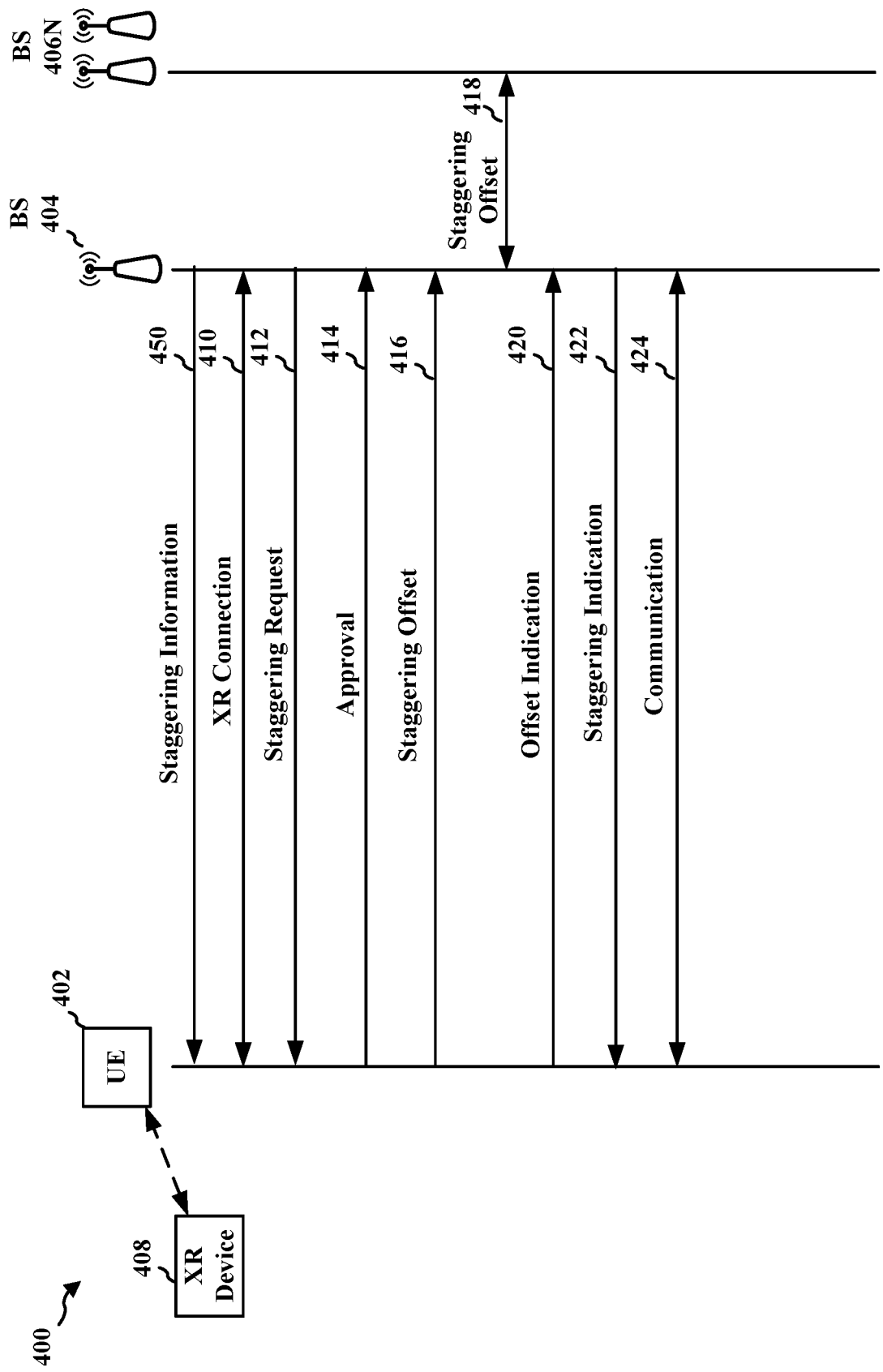
FIG. 4 illustrates an example communication between a base station and a UE.

FIG. 4 illustrates an example communication 400 between a UE 402 and a base station 404. As illustrated in FIG. 4, the UE 402 may be in connection with an XR device 408 and may transmit/receive downlink and uplink XR communications to/from the base station 404. As illustrated in FIG. 4, the base station 404 and the UE 402 may establish an XR connection 410. In some aspects, before establishing the XR connection 410 for exchanging XR data, the UE 402 and the base station 404 may already have established RRC connections. The UE 402 and the base station 404 may be configured to randomize the uplink and downlink traffic arrival rates on a per-base station or per-network basis. To facilitate randomizing the uplink and downlink traffic arrival rates, the base station may transmit one or more staggering offsets in a staggering indication 422 to the UE 402. The staggering offsets may include an uplink staggering offset for staggering uplink communications and a downlink staggering offset for staggering downlink communications. In some aspects, the staggering offsets may include an uplink staggering offset for staggering uplink communications and no downlink staggering offset.

For per-base station randomization, in some aspects, the base station 404 may transmit the staggering indication via RRC signaling. For example, the base station 404 may stagger the submission of a first XR communication of the UE 402 within a slot or a frame. Based on the first XR communication, subsequent UE communications may be staggered based on their arrival time at the RLC layer. The base station 404 may submit those traffic to the medium access control (MAC)/physical (PHY) layer at time instants that are randomly selected within N time slots or N frames (where N>=1). In some aspects, the base station may transmit a staggering request 412 via an application and indicate that the XR downlink/uplink communications to be offset based on one or more randomly selected values within N time slots or N frames (where N>=1). The UE 402 may transmit an approval 414 for the staggering request 412. Upon the XR connection 410, the base station 404 may select one or more offsets that are sent to the application for the UE 402 or used by the base station 404 as the downlink staggering offset or the uplink staggering offset. In some aspects, the base station may signal a maximum offset duration (such as in the staggering information 450) in the SIBs and the UE may report the maximum offset duration to the XR application.

For per-network randomization, in some aspects, the base station 404 may coordinate with one or more other base stations 406N so that the different base stations may be using different staggering offsets. In some aspects, the base station 404 and the one or more other base stations 406N may coordinate and agree on a staggering schedule including one or more staggering offsets 418 where each base station is associated with one or more offsets with a defined duration that do not overlap with the offset(s) associated with another base station. In some aspects, the UE 402 may be configured to report the pattern of randomization used by neighboring cells (e.g., interleaved and non-interleaved) and the staggering offsets 416 used by the neighboring cells to a particular cell that the UE 402 is connected (e.g., the base station 404). The base station 404 may attempt to avoid the pattern of randomization and the staggering offsets 416 used by the neighboring cells.

Figure 5:
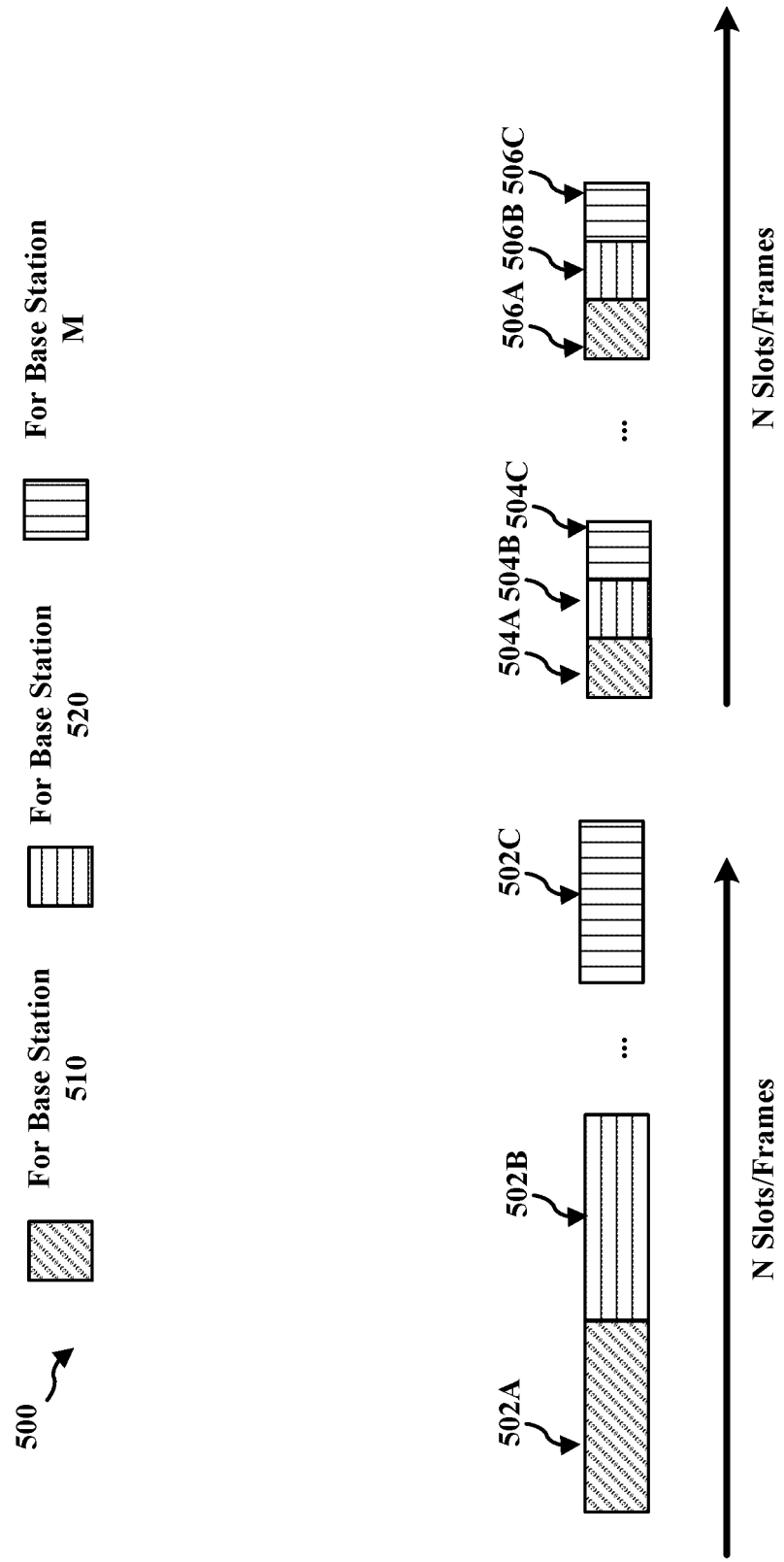
FIG. 5 illustrates example staggering schedules.

FIG. 5 illustrates an example 500 of staggering schedules. As illustrated in FIG. 5, one or more offset durations 502A, 502B, and 502C that do not overlap with each other may be associated with a base station 510, a base station 520, and a base station M. In some aspects, the one or more offset durations 504A/506A associated with the base station 510, one or more offset durations 504B/506B associated with the base station 520, and one or more offset durations 504C/506C associated with the base station M may be interleaved.

Figure 6:
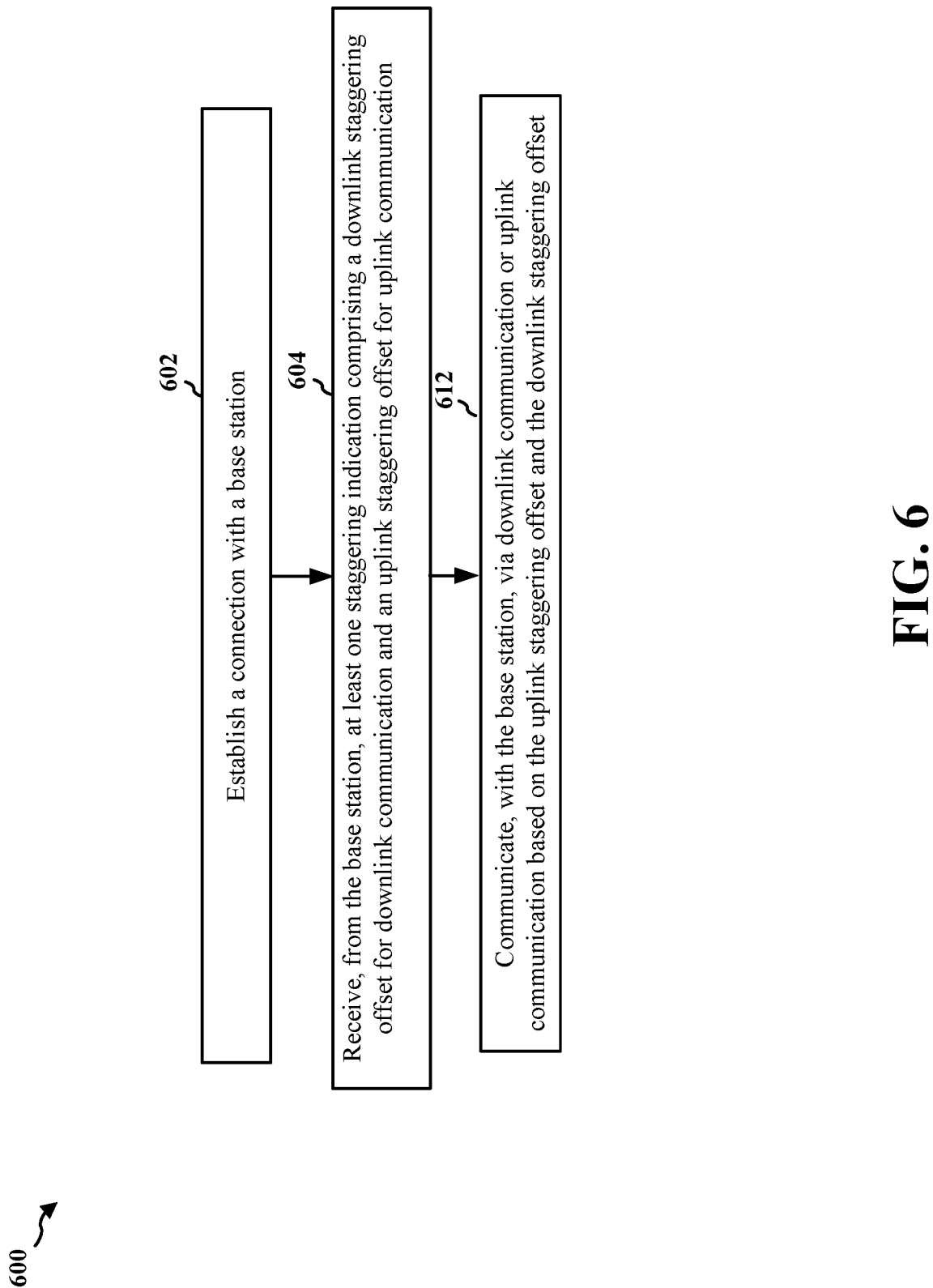
FIG. 6 is a flowchart of a method of wireless communication at a UE.

FIG. 6 is a flowchart 600 of a method of wireless communication. The method may be performed by a UE (e.g., the UE 104, the UE 402; the apparatus 1002).

At 602, the UE establishes a connection with a base station. The connection may correspond to the connection 410 in FIG. 4. For example, the UE 402 may receive establish an XR connection 410 with the base station 404. In some aspects, the UE is at least one of an XR UE, an AR UE, or a VR UE. Further, 602 may be performed by connection component 1042 in FIG. 10. In some aspects, the connection established is at least one of an XR connection, an AR connection, or a VR connection.

At 604, the UE receives, from the base station, at least one staggering indication including a downlink staggering offset for downlink communication and an uplink staggering offset for uplink communication. In some aspects, 604 may be performed by staggering indication reception component 1044 of FIG. 10. The downlink communication may be an XR, a VR, or an AR downlink communication and the uplink communication may be an XR, a VR, or an AR uplink communication. The staggering indication may correspond to the staggering indication 422 in FIG. 4. For example, the UE 402 may receive, from the base station 404, the staggering indication 422 including a downlink staggering offset for downlink communication and an uplink staggering offset for uplink communication. In some aspects, the at least one staggering indication may be received via an application associated with the connection. In some aspects, the at least one staggering indication may include a staggering request. In some aspects, the at least one staggering indication may be received via RRC signaling. In some aspects, the at least one staggering indication may include an indication to stagger downlink communication by the downlink staggering offset within at least one of a downlink slot or a downlink frame, and the at least one staggering indication may include an indication to stagger uplink communication by the uplink staggering offset within at least one of an uplink slot or an uplink frame. In some aspects, the downlink staggering offset may correspond to a downlink offset value and the uplink staggering offset may correspond to an uplink offset value, the downlink offset value and the uplink offset value being less than or equal to N slots or N frames, where N is greater than or equal to 1.

In some aspects, at 612, the UE communicates, with the base station, via downlink communication or uplink communication based on the uplink staggering offset and the downlink staggering offset. The communication may correspond to the communication 424 in FIG. 4. In some aspects, 612 may be performed by communication staggering component 1046 of FIG. 10. For example, the UE 402 may communicate with the base station 404 by exchanging communication 424 based on the uplink staggering offset and the downlink staggering offset. In some aspects, the downlink communication may be staggered based on a downlink arrival time associated with a RLC layer and the uplink communication may be staggered based on an uplink arrival time associated with the RLC layer. In some aspects, the downlink communication may be associated with at least one of a MAC layer or a PHY layer and the uplink communication may be associated with at least one of the MAC layer or the PHY layer.

Figure 7:
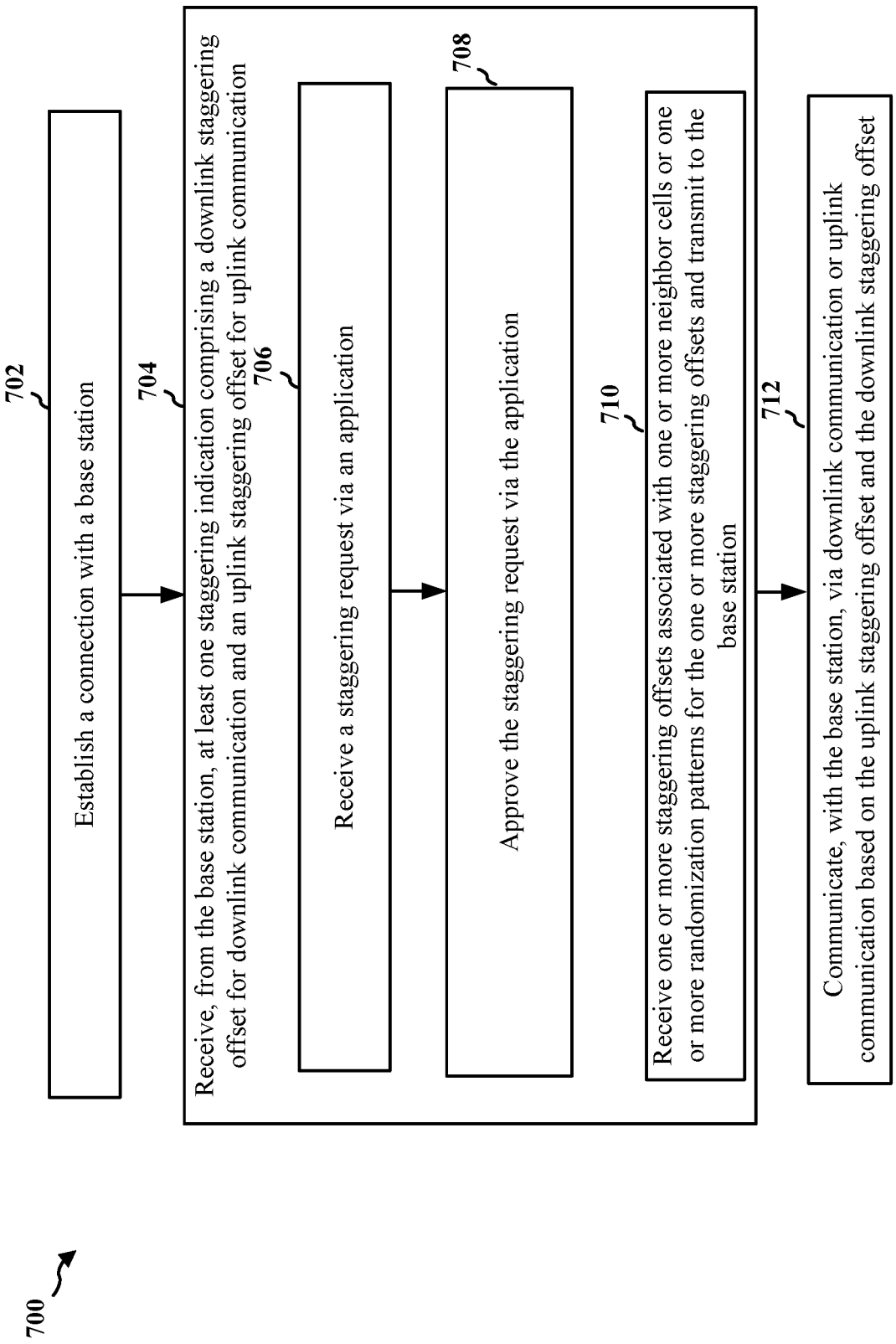
FIG. 7 is a flowchart of a method of wireless communication at a UE.

FIG. 7 is a flowchart 700 of a method of wireless communication. The method may be performed by a UE (e.g., the UE 104, the UE 402; the apparatus 1002).

At 702, the UE establishes a connection with a base station. The connection may correspond to the connection 410 in FIG. 4. For example, the UE 402 may receive establish an XR connection 410 with the base station 404. In some aspects, the UE is at least one of an XR UE, an AR UE, or a VR UE. In some aspects, 702 may be performed by connection component 1042 of FIG. 10. In some aspects, the connection established is at least one of an XR connection, an AR connection, or a VR connection.

At 704, the UE receives, from the base station, at least one staggering indication including a downlink staggering offset for downlink communication and an uplink staggering offset for uplink communication. The downlink communication may be an XR, a VR, or an AR downlink communication and the uplink communication may be an XR, a VR, or an AR uplink communication. In some aspects, 704 may be performed by staggering indication reception component 1044 of FIG. 10. The staggering indication may correspond to the staggering indication 422 in FIG. 4. For example, the UE 402 may receive, from the base station 404, the staggering indication 422 including a downlink staggering offset for downlink communication and an uplink staggering offset for uplink communication. In some aspects, the at least one staggering indication may be received via an application associated with the connection. In some aspects, the at least one staggering indication may include a staggering request. In some aspects, the at least one staggering indication may be received via RRC signaling. In some aspects, the at least one staggering indication may include an indication to stagger downlink communication by the downlink staggering offset within at least one of a downlink slot or a downlink frame, and the at least one staggering indication may include an indication to stagger uplink communication by the uplink staggering offset within at least one of an uplink slot or an uplink frame. In some aspects, the downlink staggering offset may correspond to a downlink offset value and the uplink staggering offset may correspond to an uplink offset value, the downlink offset value and the uplink offset value being less than or equal to N slots or N frames, where N is greater than or equal to 1.

In some aspects, as part of 704, at 706, the UE receives a staggering request from the base station. The staggering request may correspond to the staggering request 412 in FIG. 4. For example, the UE 402 may receive a staggering request 412 from the base station 404. In some aspects, the staggering request may include a request to stagger downlink communication by the downlink staggering offset and a request to stagger uplink communication by the uplink staggering offset.

In some aspects, as part of 704, at 708, the UE transmits an approval of the staggering request via the application. The approval may correspond to the approval 414 in FIG. 4. For example, the UE 402 may transmit an approval 414 of the staggering request 412 via the application.

In some aspects, as part of 704, at 710, the UE receives, one or more staggering offsets associated with one or more neighbor cells or one or more randomization patterns for the one or more staggering offsets, each of the one or more staggering offsets including a downlink staggering offset and an uplink staggering offset. The UE may further transmit, to the base station, the one or more staggering offsets associated with the one or more neighbor cells or the one or more randomization patterns for the one or more staggering offsets. The staggering offsets may correspond to the staggering offset 416 in FIG. 4. For example, the UE 402 may transmit, to the base station 404, the one or more staggering offsets 416 associated with the one or more neighbor cells or the one or more randomization patterns for the one or more staggering offsets. In some aspects, the downlink staggering offset for the downlink communication and the uplink staggering offset for the uplink communication may be selected based on the one or more staggering offsets.

In some aspects, the UE receives, from the base station, a maximum staggering offset duration in one or more SIBs, the maximum staggering offset duration including a maximum downlink staggering offset duration and a maximum uplink staggering offset duration. In some aspects, the downlink staggering offset is less than the maximum downlink staggering offset duration and the uplink staggering offset is less than the maximum uplink staggering offset duration. In some aspects, the UE may further report the maximum staggering offset duration to an application associated with the connection established with the base station.

In some aspects, at 712, the UE communicates, with the base station, via downlink communication or uplink communication based on the uplink staggering offset and the downlink staggering offset. In some aspects, 712 may be performed by communication staggering component 1046 of FIG. 10. The communication may correspond to the communication 424 in FIG. 4. For example, the UE 402 may communicate with the base station 404 by exchanging communication 424 based on the uplink staggering offset and the downlink staggering offset. In some aspects, the downlink communication may be staggered based on a downlink arrival time associated with a RLC layer and the uplink communication may be staggered based on an uplink arrival time associated with the RLC layer. In some aspects, the downlink communication may be associated with at least one of a MAC layer or a PHY layer and the uplink communication may be associated with at least one of the MAC layer or the PHY layer.

Figure 8:
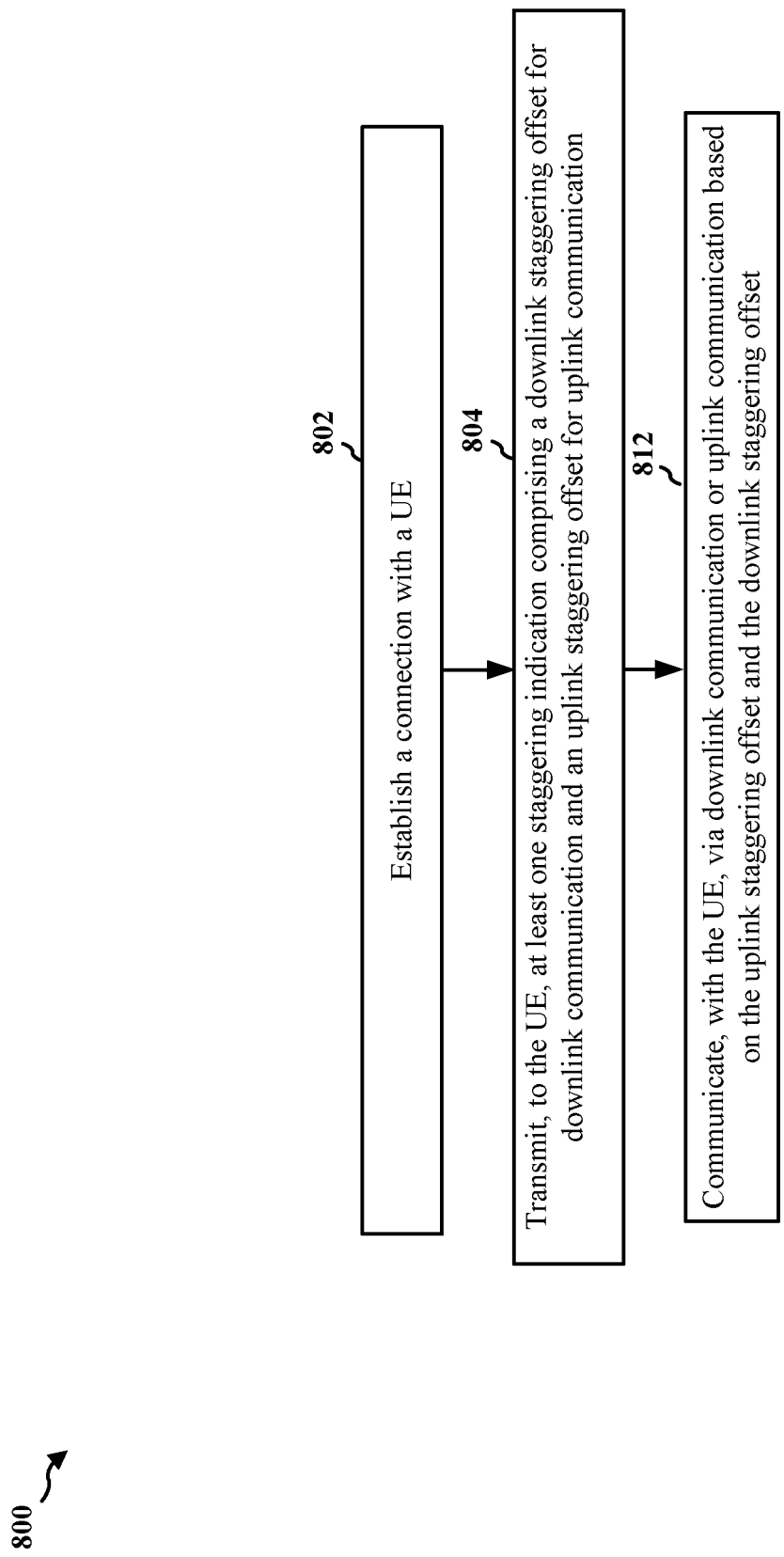
FIG. 8 is a flowchart of a method of wireless communication at a base station.

FIG. 8 is a flowchart 800 of a method of wireless communication. The method may be performed by a base station (e.g., the base station 102/180, the base station 404; the apparatus 1102).

At 802, the base station establishes a connection with a UE. The connection may correspond to the connection 410 in FIG. 4. For example, the base station 404 may establish a connection 410 with the UE 402. Further, 802 may be performed by connection component 1142 in FIG. 11. In some aspects, the UE is at least one of an XR UE, an AR UE, or a VR UE. In some aspects, the connection established is at least one of an XR connection, an AR connection, or a VR connection.

At 804, the base station transmits, to the UE, at least one staggering indication including a downlink staggering offset for downlink communication and an uplink staggering offset for uplink communication. The downlink communication may be an XR, a VR, or an AR downlink communication and the uplink communication may be an XR, a VR, or an AR uplink communication. In some aspects, 804 may be performed by staggering indication transmission component 1144 of FIG. 11. The staggering indication may correspond to the staggering indication 422 in FIG. 4. For example, the base station 404 may transmit, to the UE 402, at least one staggering indication 422 including a downlink staggering offset for downlink communication and an uplink staggering offset for uplink communication. In some aspects, the at least one staggering indication may be transmitted via an application associated with the connection. In some aspects, the at least one staggering indication may include a staggering request. In some aspects, the at least one staggering indication may be transmitted via RRC signaling. In some aspects, the at least one staggering indication may include an indication to stagger downlink communication by the downlink staggering offset within at least one of a downlink slot or a downlink frame, and the at least one staggering indication may include an indication to stagger uplink communication by the uplink staggering offset within at least one of an uplink slot or an uplink frame. In some aspects, the downlink staggering offset may correspond to a downlink offset value and the uplink staggering offset may correspond to an uplink offset value, the downlink offset value and the uplink offset value being less than or equal to N slots or N frames, where N is greater than or equal to 1.

In some aspects, at 812, the base station communicates, with the UE, via downlink communication or uplink communication based on the uplink staggering offset and the downlink staggering offset. In some aspects, 812 may be performed by communication staggering component 1146 of FIG. 11. The communication may correspond to the communication 424 in FIG. 4. For example, the base station 404 may communicate, with the UE 402, via downlink communication or uplink communication 424 based on the uplink staggering offset and the downlink staggering offset. In some aspects, the downlink communication may be staggered based on a downlink arrival time associated with a RLC layer and the uplink communication may be staggered based on an uplink arrival time associated with the RLC layer. In some aspects, the downlink communication may be associated with at least one of a MAC layer or a PHY layer and the uplink communication may be associated with at least one of the MAC layer or the PHY layer.

Figure 9:
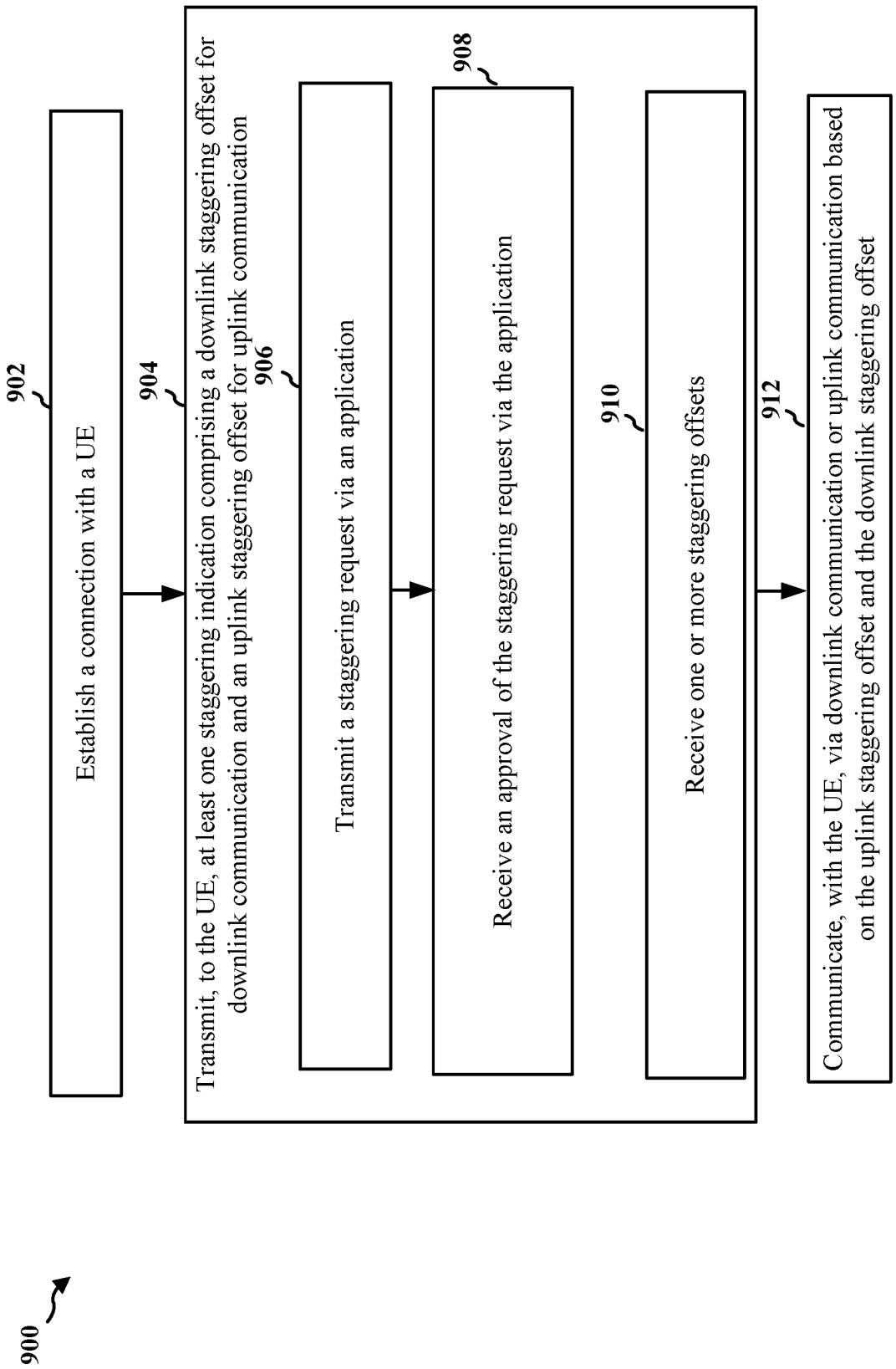
FIG. 9 is a flowchart of a method of wireless communication at a base station.

FIG. 9 is a flowchart 900 of a method of wireless communication. The method may be performed by a base station (e.g., the base station 102/180, the base station 404; the apparatus 1102).

At 902, the base station establishes a connection with a UE. The connection may correspond to the connection 410 in FIG. 4. For example, the base station 404 may establish a connection 410 with the UE 402. Further, 902 may be performed by connection component 1142 in FIG. 11. In some aspects, the UE is at least one of an XR UE, an AR UE, or a VR UE. In some aspects, the connection established is at least one of an XR connection, an AR connection, or a VR connection.

At 904, the base station transmits, to the UE, at least one staggering indication including a downlink staggering offset for downlink communication and an uplink staggering offset for uplink communication. In some aspects, 904 may be performed by staggering indication transmission component 1144 of FIG. 11. The downlink communication may be an XR, a VR, or an AR downlink communication and the uplink communication may be an XR, a VR, or an AR uplink communication. The staggering indication may correspond to the staggering indication 422 in FIG. 4. For example, the base station 404 may transmit, to the UE 402, at least one staggering indication 422 including a downlink staggering offset for downlink communication and an uplink staggering offset for uplink communication. In some aspects, the at least one staggering indication may be transmitted via an application associated with the connection. In some aspects, the at least one staggering indication may include a staggering request. In some aspects, the at least one staggering indication may be transmitted via RRC signaling. In some aspects, the at least one staggering indication may include an indication to stagger downlink communication by the downlink staggering offset within at least one of a downlink slot or a downlink frame, and the at least one staggering indication may include an indication to stagger uplink communication by the uplink staggering offset within at least one of an uplink slot or an uplink frame. In some aspects, the downlink staggering offset may correspond to a downlink offset value and the uplink staggering offset may correspond to an uplink offset value, the downlink offset value and the uplink offset value being less than or equal to N slots or N frames, where N is greater than or equal to 1.

In some aspects, as part of 904, at 906, the base station transmits a staggering request to the UE. The staggering request may correspond to the staggering request 412 in FIG. 4. For example, the base station 404 may transmit a staggering request 412 to the UE 402. In some aspects, the staggering request may include a request to stagger downlink communication by the downlink staggering offset and a request to stagger uplink communication by the uplink staggering offset.

In some aspects, as part of 904, at 908, the base station receives an approval of the staggering request via the application. The approval may correspond to the approval 414 in FIG. 4. In some aspects, the base station 404 may receive an approval 414 of the staggering request from the UE 402 via the application.

In some aspects, as part of 904, at 910, the base station receives, from the UE, one or more staggering offsets associated with one or more neighbor cells or one or more randomization patterns for the one or more staggering offsets, each of the one or more staggering offsets including a downlink staggering offset and an uplink staggering offset.

The staggering offsets may correspond to the staggering offset 416 in FIG. 4. For example, the base station 404 may receive, from the UE 402, one or more staggering offsets including the staggering offset 416 from the UE 402. In some aspects, the downlink staggering offset for the downlink communication and the uplink staggering offset for the uplink communication are selected based on the one or more staggering offsets. For example, the base station may attempt to select the downlink staggering offset for the downlink communication and the uplink staggering offset for the uplink communication to be different from the one or more staggering offsets. In some aspects, at 910, the base station receives from at least one other base station, a staggering schedule including one or more candidate staggering offsets for one or more base stations including the base station. For example, the base station 404 may receive from at least one other base station 406N, a staggering schedule including one or more candidate staggering offsets 418 for one or more base stations including the base station 404. The downlink staggering offset and the uplink staggering offset may be selected from the one or more candidate staggering offsets for the base station.

In some aspects, the base station may transmit, to the UE, a maximum staggering offset duration in one or more SIBs, the maximum staggering offset duration including a maximum downlink staggering offset duration and a maximum uplink staggering offset duration. In some aspects, the downlink staggering offset is less than the maximum downlink staggering offset duration and the uplink staggering offset is less than the maximum uplink staggering offset duration.

In some aspects, at 912, the base station communicates, with the UE, via downlink communication or uplink communication based on the uplink staggering offset and the downlink staggering offset. In some aspects, 912 may be performed by communication staggering component 1146 of FIG. 11. The communication may correspond to the communication 424 in FIG. 4. For example, the base station 404 may communicate, with the UE 402, via downlink communication or uplink communication 424 based on the uplink staggering offset and the downlink staggering offset. In some aspects, the downlink communication may be staggered based on a downlink arrival time associated with a RLC layer and the uplink communication may be staggered based on an uplink arrival time associated with the RLC layer. In some aspects, the downlink communication may be associated with at least one of a MAC layer or a PHY layer and the uplink communication may be associated with at least one of the MAC layer or the PHY layer.

Figure 10:
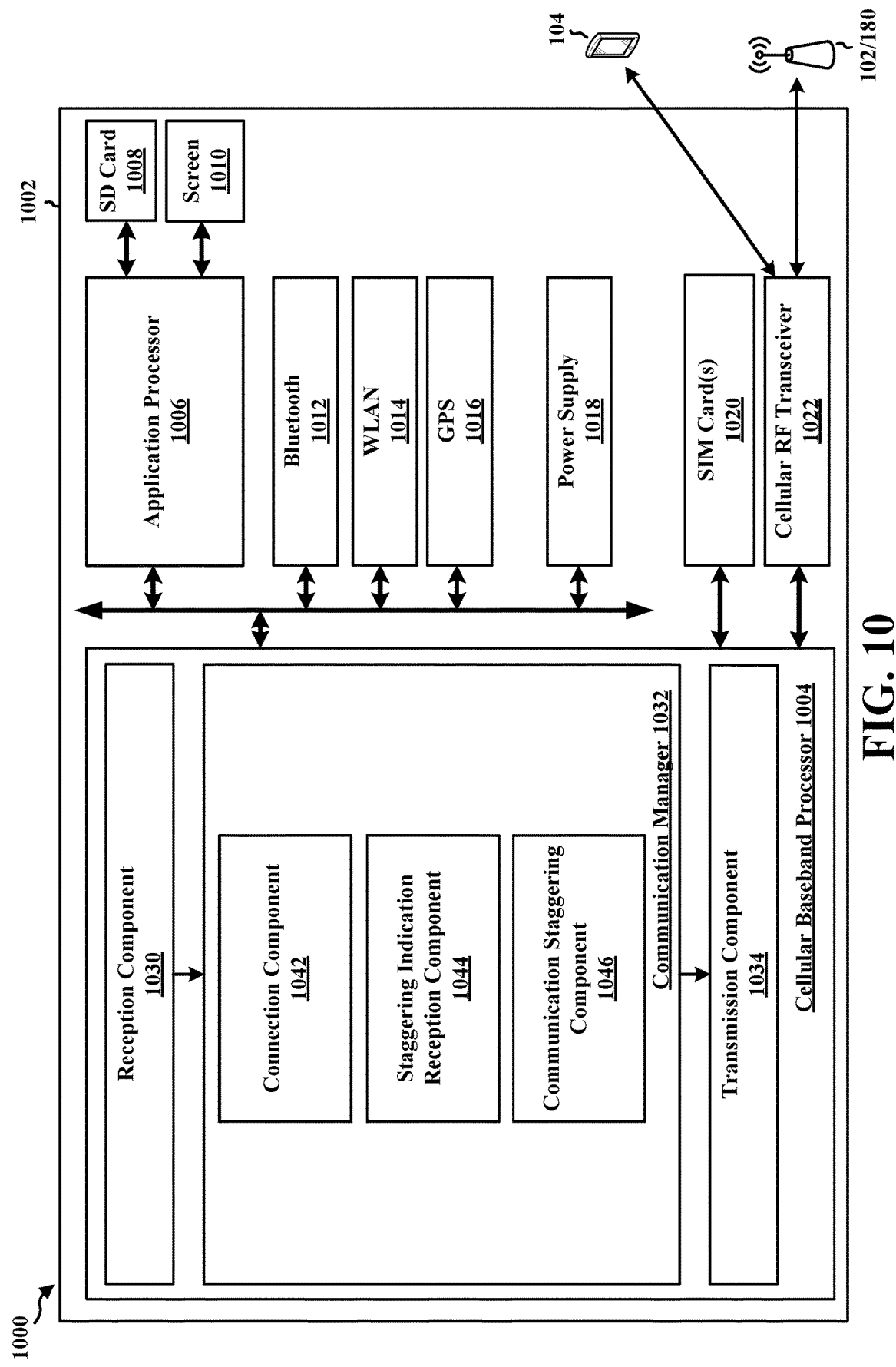
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a connection component 1042 that establishes a connection with a base station, e.g., as described in connection with 602 in FIG. 6, or 702 in FIG. 8. The communication manager 1032 further includes a staggering indication reception component 1044 that receives, from the base station, at least one staggering indication including a downlink staggering offset for downlink communication and an uplink staggering offset for uplink communication, e.g., as described in connection with 604 in FIG. 6, or 704 in FIG. 7. The communication manager 932 further includes a communication staggering component 1046 that communicates, with the base station, via downlink communication or uplink communication based on the uplink staggering offset and the downlink staggering offset, e.g., as described in connection with 612 in FIG. 6, or 712 in FIG. 7.

The apparatus may include additional components that perform each of the blocks of the algorithm in the aforementioned flowcharts of FIGS. 6-7. As such, each block in the aforementioned flowcharts of FIGS. 6-7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for establishing a connection with a base station. The cellular baseband processor 1004 may further include means for receiving, from the base station, at least one staggering indication including a downlink staggering offset for downlink communication and an uplink staggering offset for uplink communication, the downlink communication being an XR, a VR, or an AR downlink communication and the uplink communication being an XR, a VR, or an AR uplink communication. The cellular baseband processor 1004 may further include means for communicating, with the base station, via downlink communication or uplink communication based on the uplink staggering offset and the downlink staggering offset. The cellular baseband processor 1004 may further include means for approving the staggering request via the application. The cellular baseband processor 1004 may further include means for receiving, from the base station, a maximum staggering offset duration in one or more SIBs, the maximum staggering offset duration including a maximum downlink staggering offset duration and a maximum uplink staggering offset duration. The cellular baseband processor 1004 may further include means for reporting the maximum staggering offset duration to an application associated with the connection established with the base station. The cellular baseband processor 1004 may further include means for receiving one or more staggering offsets associated with one or more neighbor cells or one or more randomization patterns for the one or more staggering offsets, each of the one or more staggering offsets including a downlink staggering offset and an uplink staggering offset. The cellular baseband processor 1004 may further include means for transmitting, to the base station, the one or more staggering offsets associated with the one or more neighbor cells or the one or more randomization patterns for the one or more staggering offsets. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
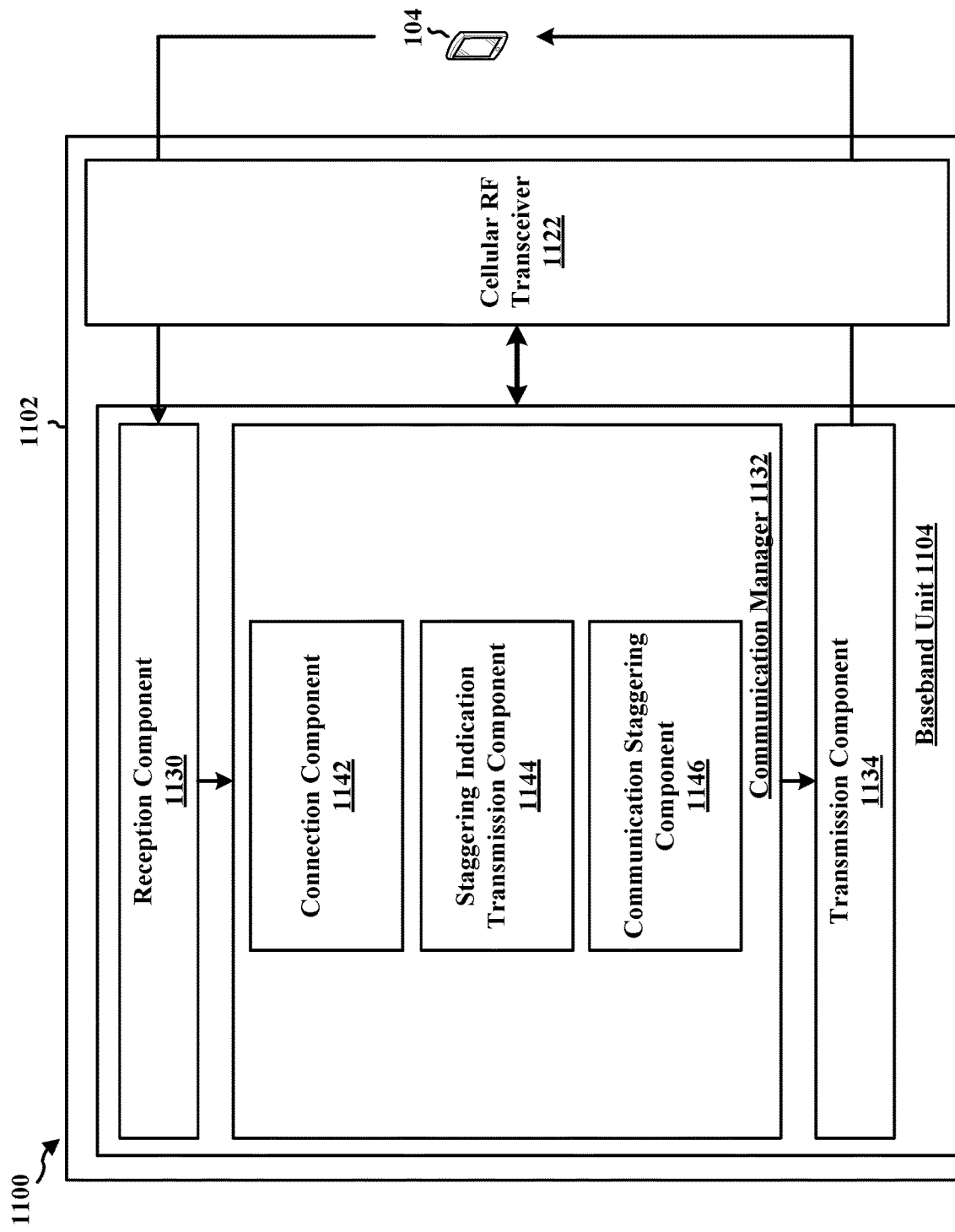
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a connection component 1142 that establishes a connection with a UE, e.g., as described in connection with 802 in FIG. 8, or 902 in FIG. 9. The communication manager 1132 further includes a staggering indication transmission component 1144 that transmits, to the UE, at least one staggering indication including a downlink staggering offset for downlink communication and an uplink staggering offset for uplink communication, e.g., as described in connection with 804 in FIG. 8, or 904 in FIG. 9. The communication manager 1132 further includes a communication staggering component 1146 that communicates, with the UE, via downlink communication or uplink communication based on the uplink staggering offset and the downlink staggering offset, e.g., as described in connection with 812 in FIG. 8, or 912 in FIG. 9.

The apparatus may include additional components that perform each of the blocks of the algorithm in the aforementioned flowcharts of FIGS. 8-9. As such, each block in the aforementioned flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for establishing a connection with a UE. The baseband unit 1104 may further include means for transmitting, to the UE, at least one staggering indication including a downlink staggering offset for downlink communication and an uplink staggering offset for uplink communication, the downlink communication being an XR, a VR, or an AR downlink communication and the uplink communication being an XR, a VR, or an AR uplink communication. The baseband unit 1104 may further include means for communicating, with the UE, via downlink communication or uplink communication based on the uplink staggering offset and the downlink staggering offset. The baseband unit 1104 may further include means for receiving an approval of the staggering request via the application. The baseband unit 1104 may further include means for receiving, from the UE, one or more staggering offsets associated with one or more neighbor cells or one or more randomization patterns for the one or more staggering offsets, each of the one or more staggering offsets including a downlink staggering offset and an uplink staggering offset. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: establish a connection with a base station; receive, from the base station, at least one staggering indication comprising a downlink staggering offset for downlink communication and an uplink staggering offset for uplink communication, the downlink communication being an XR, a VR, or an AR downlink communication and the uplink communication being an XR, a VR, or an AR uplink communication; and communicate, with the base station, via downlink communication or uplink communication based on the uplink staggering offset and the downlink staggering offset.

Aspect 2 is the apparatus of aspect 1, wherein the at least one staggering indication includes an indication to stagger downlink communication by the downlink staggering offset within at least one of a downlink slot or a downlink frame, and the at least one staggering indication includes an indication to stagger uplink communication by the uplink staggering offset within at least one of an uplink slot or an uplink frame.

Aspect 3 is the apparatus of any of aspects 1-2, wherein the downlink communication is staggered based on a downlink arrival time associated with a RLC layer, and the uplink communication is staggered based on an uplink arrival time associated with the RLC layer.

Aspect 4 is the apparatus of any of aspects 1-3, wherein the downlink communication is associated with at least one of a MAC layer or a PHY layer, and the uplink communication is associated with at least one of the MAC layer or the PHY layer.

Aspect 5 is the apparatus of any of aspects 1-4, wherein the at least one staggering indication is received via an application associated with the connection, the at least one staggering indication including a staggering request, the staggering request including a request to stagger downlink communication by the downlink staggering offset and a request to stagger uplink communication by the uplink staggering offset, wherein the at least one processor is further configured to: approve the staggering request via the application.

Aspect 6 is the apparatus of any of aspects 1-5, wherein the downlink staggering offset corresponds to a downlink offset value and the uplink staggering offset corresponds to an uplink offset value, the downlink offset value and the uplink offset value being less than or equal to N slots or N frames, where N is greater than or equal to 1.

Aspect 7 is the apparatus of any of aspects 1-6, wherein the at least one processor is further configured to receive, from the base station, a maximum staggering offset duration in one or more SIBs, the maximum staggering offset duration including a maximum downlink staggering offset duration and a maximum uplink staggering offset duration.

Aspect 8 is the apparatus of any of aspects 1-7, wherein the at least one processor is further configured to report the maximum staggering offset duration to an application associated with the connection established with the base station.

Aspect 9 is the apparatus of any of aspects 1-8, wherein the downlink staggering offset is less than the maximum downlink staggering offset duration and the uplink staggering offset is less than the maximum uplink staggering offset duration.

Aspect 10 is the apparatus of any of aspects 1-9, wherein the at least one processor is further configured to: receive one or more staggering offsets associated with one or more neighbor cells or one or more randomization patterns for the one or more staggering offsets, each of the one or more staggering offsets including a downlink staggering offset and an uplink staggering offset; and transmit, to the base station, the one or more staggering offsets associated with the one or more neighbor cells or the one or more randomization patterns for the one or more staggering offsets.

Aspect 11 is the apparatus of any of aspects 1-10, wherein the UE is at least one of an XR UE, an AR UE, or a VR UE; wherein the connection established is at least one of an XR connection, an AR connection, or a VR connection.

Aspect 12 is the apparatus of any of aspects 1-11, wherein the at least one staggering indication is received via RRC signaling.

Aspect 13 is the apparatus of any of aspects 1-12, further comprising a transceiver coupled to the at least one processor.

Aspect 14 is an apparatus for wireless communication at a base station, comprising: a memory; and at least one processor coupled to the memory and configured to: establish a connection with a UE; transmit, to the UE, at least one staggering indication comprising a downlink staggering offset for downlink communication and an uplink staggering offset for uplink communication, the downlink communication being an XR, a VR, or an AR downlink communication and the uplink communication being an XR, a VR, or an AR uplink communication; and communicate, with the UE, via downlink communication or uplink communication based on the uplink staggering offset and the downlink staggering offset.

Aspect 15 is the apparatus of aspect 14, wherein the at least one staggering indication includes an indication to stagger downlink communication by the downlink staggering offset within at least one of a downlink slot or a downlink frame, and the at least one staggering indication includes an indication to stagger uplink communication by the uplink staggering offset within at least one of an uplink slot or an uplink frame.

Aspect 16 is the apparatus of any of aspects 14-15, wherein the downlink communication is staggered based on a downlink arrival time associated with a RLC layer, and the uplink communication is staggered based on an uplink arrival time associated with the RLC layer.

Aspect 17 is the apparatus of any of aspects 14-16, wherein the downlink communication is associated with at least one of a MAC layer or a PHY layer, and the uplink communication is associated with at least one of the MAC layer or the PHY layer Aspect 18 is the apparatus of any of aspects 14-17, wherein the at least one staggering indication is transmitted via an application associated with the connection, the at least one staggering indication including a staggering request, the staggering request including a request to stagger downlink communication by the downlink staggering offset and a request to stagger uplink communication by the uplink staggering offset, wherein the at least one processor is further configured to: receive an approval of the staggering request via the application.

Aspect 19 is the apparatus of any of aspects 14-18, wherein the downlink staggering offset corresponds to a downlink offset value and the uplink staggering offset corresponds to an uplink offset value, the downlink offset value and the uplink offset value being less than or equal to N slots or N frames, where N is greater than or equal to 1.

Aspect 20 is the apparatus of any of aspects 14-19, wherein the at least one processor is further configured to transmit, to the UE, a maximum staggering offset duration in one or more SIBs, the maximum staggering offset duration including a maximum downlink staggering offset duration and a maximum uplink staggering offset duration.

Aspect 21 is the apparatus of any of aspects 14-20, wherein the downlink staggering offset is less than the maximum downlink staggering offset duration and the uplink staggering offset is less than the maximum uplink staggering offset duration.

Aspect 22 is the apparatus of any of aspects 14-21, wherein the at least one processor is further configured to: receive, from the UE, one or more staggering offsets associated with one or more neighbor cells or one or more randomization patterns for the one or more staggering offsets, each of the one or more staggering offsets including a downlink staggering offset and an uplink staggering offset, wherein the downlink staggering offset for the downlink communication and the uplink staggering offset for the uplink communication are selected based on the one or more staggering offsets.

Aspect 23 is the apparatus of any of aspects 14-22, wherein the UE is at least one of an XR UE, an AR UE, or a VR UE; wherein the connection established is at least one of an XR connection, an AR connection, or a VR connection.

Aspect 24 is the apparatus of any of aspects 14-23, wherein the at least one staggering indication is transmitted via RRC signaling.

Aspect 25 is the apparatus of any of aspects 14-24, wherein the at least one processor is further configured to: receive, from at least one other base station, a staggering schedule comprising one or more candidate staggering offsets for one or more base stations including the base station; wherein the downlink staggering offset and the uplink staggering offset are selected from the one or more candidate staggering offsets for the base station.

Aspect 26 is the apparatus of any of aspects 14-25, further comprising a transceiver coupled to the at least one processor.

Aspect 27 is a method of wireless communication for implementing any of aspects 1 to 13.

Aspect 28 is an apparatus for wireless communication including means for implementing any of aspects 1 to 13.

Aspect 29 is a computer-readable medium storing computer executable code, where the code when executed by a processor causes the processor to implement any of aspects 1 to 13.

Aspect 30 is a method of wireless communication for implementing any of aspects 14 to 26.

Aspect 31 is an apparatus for wireless communication including means for implementing any of aspects 14 to 26.

Aspect 32 is a computer-readable medium storing computer executable code, where the code when executed by a processor causes the processor to implement any of aspects 14 to 26.

What is claimed is:

1. An apparatus for wireless communication at a user equipment (UE), comprising:
   memory; and
   at least one processor coupled to the memory and configured to:
   establish a connection with a base station;
   receive, from the base station, at least one staggering indication comprising a downlink staggering offset for downlink communication and an uplink staggering offset for uplink communication, the downlink communication being an extended reality (XR), a virtual reality (VR), or an augmented reality (AR) downlink communication and the uplink communication being an XR, a VR, or an AR uplink communication, wherein the downlink staggering offset corresponds to a downlink offset value and the uplink staggering offset corresponds to an uplink offset value, the downlink offset value and the uplink offset value being less than or equal to N slots or N frames, where N is greater than or equal to 1; and
   communicate, with the base station, via downlink communication or uplink communication based on the uplink staggering offset and the downlink staggering offset.

2. The apparatus of claim 1, wherein the at least one staggering indication includes an indication to stagger downlink communication by the downlink staggering offset within at least one of a downlink slot or a downlink frame, and the at least one staggering indication includes an indication to stagger uplink communication by the uplink staggering offset within at least one of an uplink slot or an uplink frame.

3. The apparatus of claim 2, wherein the downlink communication is staggered based on a downlink arrival time associated with a radio link control (RLC) layer, and the uplink communication is staggered based on an uplink arrival time associated with the RLC layer.

4. The apparatus of claim 3, wherein the downlink communication is associated with at least one of a medium access control (MAC) layer or a physical (PHY) layer, and the uplink communication is associated with at least one of the MAC layer or the PHY layer.

5. The apparatus of claim 1, wherein to receive the at least one staggering indication, the at least one processor is configured to receive the at least one staggering indication via an application associated with the connection, the at least one staggering indication including a staggering request, the staggering request including a request to stagger downlink communication by the downlink staggering offset and a request to stagger uplink communication by the uplink staggering offset, wherein the at least one processor is further configured to:

approve the staggering request via the application.

6. The apparatus of claim 1, wherein the at least one processor is further configured to receive, from the base station, a maximum staggering offset duration in one or more SIBs, the maximum staggering offset duration including a maximum downlink staggering offset duration and a maximum uplink staggering offset duration.

7. The apparatus of claim 6, wherein the at least one processor is further configured to report the maximum staggering offset duration to an application associated with the connection established with the base station.

8. The apparatus of claim 7, wherein the downlink staggering offset is less than the maximum downlink staggering offset duration and the uplink staggering offset is less than the maximum uplink staggering offset duration.

9. The apparatus of claim 1, wherein the at least one processor is further configured to:

receive one or more staggering offsets associated with one or more neighbor cells or one or more randomization patterns for the one or more staggering offsets, each of the one or more staggering offsets including a downlink staggering offset and an uplink staggering offset; and transmit, to the base station, the one or more staggering offsets associated with the one or more neighbor cells or the one or more randomization patterns for the one or more staggering offsets.

10. The apparatus of claim 1, wherein the UE is at least one of an XR UE, an AR UE, or a VR UE;

wherein the connection established is at least one of an XR connection, an AR connection, or a VR connection.

11. The apparatus of claim 1, wherein the at least one staggering indication is received via RRC signaling.

12. The apparatus of claim 1, further comprising a transceiver coupled to the at least one processor.

13. An apparatus for wireless communication at a base station, comprising:

memory; and at least one processor coupled to the memory and configured to:

establish a connection with a UE;

transmit, to the UE, at least one staggering indication comprising a downlink staggering offset for downlink communication and an uplink staggering offset for uplink communication, the downlink communication being an extended reality (XR), a virtual reality (VR), or an augmented reality (AR) downlink communication and the uplink communication being an XR, a VR, or an AR uplink communication, wherein the downlink staggering offset corresponds to a downlink offset value and the uplink staggering offset corresponds to an uplink offset value, the downlink offset value and the uplink offset value being less than or equal to N slots or N frames, where N is greater than or equal to 1; and communicate, with the UE, via downlink communication or uplink communication based on the uplink staggering offset and the downlink staggering offset.

14. The apparatus of claim 13, wherein the at least one staggering indication includes an indication to stagger downlink communication by the downlink staggering offset within at least one of a downlink slot or a downlink frame, and the at least one staggering indication includes an indication to stagger uplink communication by the uplink staggering offset within at least one of an uplink slot or an uplink frame.

15. The apparatus of claim 14, wherein the downlink communication is staggered based on a downlink arrival time associated with a radio link control (RLC) layer, and the uplink communication is staggered based on an uplink arrival time associated with the RLC layer.

16. The apparatus of claim 15, wherein the downlink communication is associated with at least one of a medium access control (MAC) layer or a physical (PHY) layer, and the uplink communication is associated with at least one of the MAC layer or the PHY layer.

17. The apparatus of claim 13, wherein to transmit the at least one staggering indication, the at least one processor is configured to transmit the at least one staggering indication via an application associated with the connection, the at least one staggering indication including a staggering request, the staggering request including a request to stagger downlink communication by the downlink staggering offset and a request to stagger uplink communication by the uplink staggering offset, wherein the at least one processor is further configured to:

receive an approval of the staggering request via the application.

18. The apparatus of claim 13, wherein the at least one processor is further configured to transmit, to the UE, a maximum staggering offset duration in one or more system information blocks (SIBs), the maximum staggering offset duration including a maximum downlink staggering offset duration and a maximum uplink staggering offset duration.

19. The apparatus of claim 18, wherein the downlink staggering offset is less than the maximum downlink staggering offset duration and the uplink staggering offset is less than the maximum uplink staggering offset duration.

20. The apparatus of claim 13, wherein the at least one processor is further configured to:

receive, from the UE, one or more staggering offsets associated with one or more neighbor cells or one or more randomization patterns for the one or more staggering offsets, each of the one or more staggering offsets including a downlink staggering offset and an uplink staggering offset, wherein the downlink staggering offset for the downlink communication and the uplink staggering offset for the uplink communication are selected based on the one or more staggering offsets.

21. The apparatus of claim 13, wherein the UE is at least one of an XR UE, an AR UE, or a VR UE;

wherein the connection established is at least one of an XR connection, an AR connection, or a VR connection.

22. The apparatus of claim 13, wherein the at least one staggering indication is transmitted via RRC signaling.

23. The apparatus of claim 13, wherein the at least one processor is further configured to:

receive, from at least one other base station, a staggering schedule comprising one or more candidate staggering offsets for one or more base stations including the base station;

wherein the downlink staggering offset and the uplink staggering offset are selected from the one or more candidate staggering offsets for the base station.

24. The apparatus of claim 13, further comprising a transceiver coupled to the at least one processor.

25. A method of wireless communication at a user equipment (UE), comprising:

establishing a connection with a base station;

receiving, from the base station, at least one staggering indication comprising a downlink staggering offset for downlink communication and an uplink staggering offset for uplink communication, the downlink communication being an extended reality (XR), a virtual reality (VR), or an augmented reality (AR) downlink communication and the uplink communication being an XR, a VR, or an AR uplink communication, wherein the downlink staggering offset corresponds to a downlink offset value and the uplink staggering offset corresponds to an uplink offset value, the downlink offset value and the uplink offset value being less than or equal to N slots or N frames, where N is greater than or equal to 1; and communicating, with the base station, via downlink communication or uplink communication based on the uplink staggering offset and the downlink staggering offset.

26. The method of claim 25, wherein the at least one staggering indication includes an indication to stagger downlink communication by the downlink staggering offset within at least one of a downlink slot or a downlink frame, and the at least one staggering indication includes an indication to stagger uplink communication by the uplink staggering offset within at least one of an uplink slot or an uplink frame.

27. A method of wireless communication at a base station, comprising:

establishing a connection with a user equipment (UE);

transmitting, to the UE, at least one staggering indication comprising a downlink staggering offset for downlink communication and an uplink staggering offset for uplink communication, the downlink communication being an extended reality (XR), a virtual reality (VR), or an augmented reality (AR) downlink communication and the uplink communication being an XR, a VR, or an AR uplink communication, wherein the downlink staggering offset corresponds to a downlink offset value and the uplink staggering offset corresponds to an uplink offset value, the downlink offset value and the uplink offset value being less than or equal to N slots or N frames, where N is greater than or equal to 1; and communicating, with the UE, via downlink communication or uplink communication based on the uplink staggering offset and the downlink staggering offset.

28. The method of claim 27, wherein the at least one staggering indication includes an indication to stagger downlink communication by the downlink staggering offset within at least one of a downlink slot or a downlink frame, and the at least one staggering indication includes an indication to stagger uplink communication by the uplink staggering offset within at least one of an uplink slot or an uplink frame.

* * * * *